United States Patent
Yokomura et al.

(10) Patent No.: US 11,919,251 B2
(45) Date of Patent: Mar. 5, 2024

(54) ADHESIVE MEMBER, ADHESION METHOD, AND METHOD FOR MANUFACTURING ELECTRONIC DEVICE CASING

(71) Applicant: Mitsubishi Electric Corporation, Tokyo (JP)

(72) Inventors: Nobuo Yokomura, Tokyo (JP); Koji Kamiyama, Tokyo (JP); Atsuki Watai, Tokyo (JP); Kentaro Nagata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 108 days.

(21) Appl. No.: 17/762,731

(22) PCT Filed: Nov. 15, 2019

(86) PCT No.: PCT/JP2019/044824
§ 371 (c)(1),
(2) Date: Mar. 23, 2022

(87) PCT Pub. No.: WO2021/095224
PCT Pub. Date: May 20, 2021

(65) Prior Publication Data
US 2022/0339886 A1 Oct. 27, 2022

(51) Int. Cl.
*B29C 65/50* (2006.01)
*B29C 65/56* (2006.01)
(Continued)

(52) U.S. Cl.
CPC ........ *B29C 65/5057* (2013.01); *B29C 65/561* (2013.01); *B29K 2105/0097* (2013.01); *B29K 2105/046* (2013.01); *B29L 2031/3481* (2013.01)

(58) Field of Classification Search
CPC ...... F16B 19/02; F16B 11/006; F16B 21/086; Y10T 403/472; B29L 2031/3481
See application file for complete search history.

(56) References Cited

U.S. PATENT DOCUMENTS 3,897,713 A * 8/1975 Gugle ............... F16B 25/10
416/213 A
5,589,246 A 12/1996 Calhoun et al.
(Continued)

FOREIGN PATENT DOCUMENTS

DE  102 05 761 A1  8/2003
DE  202 21 498 U1  4/2006
(Continued)

OTHER PUBLICATIONS

International Search Report and Written Opinion dated Dec. 17, 2019, received for PCT Application PCT/JP2019/044824, Filed on Nov. 15, 2019, 8 pages including English Translation.
(Continued)

*Primary Examiner* — Carson Gross
(74) *Attorney, Agent, or Firm* — XSENSUS LLP

(57) ABSTRACT

An adhesive member includes: a first pin portion to be inserted into a first hole formed in a first adherend member; a second pin portion which is to be inserted into a second hole formed in a second adherend member to be adhered to the first adherend member, and is formed coaxially with the first pin portion; and a flange portion which is formed using an adhesive, and is mounted to a side surface of the first pin portion or a side surface of the second pin portion in a flange shape.

18 Claims, 14 Drawing Sheets

(51) Int. Cl.
    *B29K 105/00*     (2006.01)
    *B29K 105/04*     (2006.01)
    *B29L 31/34*     (2006.01)

(56) References Cited

U.S. PATENT DOCUMENTS

| | | | |
|---|---|---|---|
| 9,937,693 B2 * | 4/2018 | Erb | F16B 39/02 |
| 2003/0162046 A1 | 8/2003 | Kimura et al. | |
| 2014/0079507 A1 | 3/2014 | Brunner et al. | |
| 2019/0338797 A1 * | 11/2019 | Germann | B21J 15/147 |
| 2021/0164508 A1 * | 6/2021 | Ookubo | F16B 13/0825 |

FOREIGN PATENT DOCUMENTS

| | | | | |
|---|---|---|---|---|
| JP | 8-204335 A | | 8/1996 | |
| JP | 2003-258445 A | | 9/2003 | |
| JP | 3542673 B2 | | 7/2004 | |
| JP | 2015-164973 A | | 9/2015 | |
| JP | 2015164973 A | * | 9/2015 | |
| KR | 1998-18376 A | | 6/1998 | |
| WO | WO-2017060334 A1 | * | 4/2017 | F16B 12/20 |

OTHER PUBLICATIONS

Indian Office Action dated Aug. 22, 2022, in Indian Application No. 202227026417.
Office Action dated Jun. 16, 2023, in corresponding Chinese patent Application No. 201980101662.9, 23 pages.

\* cited by examiner

ADHESIVE MEMBER, ADHESION METHOD, AND METHOD FOR MANUFACTURING ELECTRONIC DEVICE CASING

CROSS-REFERENCE TO RELATED APPLICATION

The present application is based on PCT filing PCT/JP2019/044824, filed Nov. 15, 2019, the entire contents of which are incorporated herein by reference.

TECHNICAL FIELD

The present invention relates to an adhesive member, an adhesion method using the above-mentioned adhesive member, and a method of manufacturing an electronic device casing using the above-mentioned adhesion method.

BACKGROUND ART

A metal casing used as a casing of an electronic device is disclosed in Patent Literature 1. The metal casing includes a casing main body made of metal, and metal components such as a side wall portion, bosses, and a rib. Each of the metal components is joined to the casing main body with a conductive adhesive containing metal powder.

CITATION LIST

Patent Literature

[PTL 1] JP 2003-258445 A

SUMMARY OF INVENTION

Technical Problem

When adherend members are adhered to each other with an adhesive as in the metal casing, the adhesive is applied to one of the adherend members, and the other of the adherend members and the one of the adherend members are bonded to each other via the adhesive. In general, after the adherend members are bonded to each other, positions of the adherend members are not adjusted. This is because it is difficult to shift the positions of the adherend members in contact with the adhesive, or because when the positions of the adherend members in contact with the adhesive are shifted, the amount of the adhesive becomes partially insufficient due to a flow of the adhesive, with the result that sink marks or bubbles are formed in the cured adhesive layer. Thus, positional alignment of the adherend members is required to be performed so as to prevent contact of the other of the adherend members with the adhesive before the adherend members are bonded to each other. Thus, there is a problem in that, when the adherend members are to be adhered to each other, it is difficult to accurately perform positional alignment of the adherend members.

The present invention has been made to solve the problem described above, and has an object to provide an adhesive member, an adhesion method, and a method of manufacturing an electronic device casing, which enable accurate positional alignment of adherend members.

Solution to Problem

According to the present invention, an adhesive member includes: a first pin portion to be inserted into a first hole formed in a first adherend member; a second pin portion which is to be inserted into a second hole formed in a second adherend member to be adhered to the first adherend member, and is formed coaxially with the first pin portion; and a flange portion which is formed using an adhesive, and is mounted to a side surface of the first pin portion or a side surface of the second pin portion in a flange shape.

According to the present invention, an adhesion method includes adhering the first adherend member and the second adherend member to each other using the adhesive member of the present invention.

According to the present invention, a method of manufacturing an electronic device casing includes manufacturing an electronic device casing using the adhesion method of the present invention.

Advantageous Effects of Invention

According to the present invention, it is possible to perform accurate positional alignment of the adherend members.

DESCRIPTION OF EMBODIMENTS

First Embodiment

Figure 1:
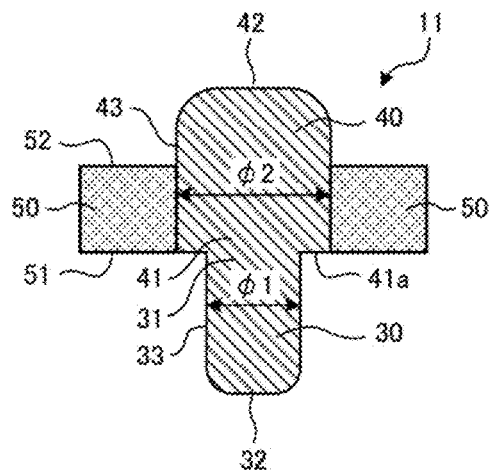
FIG. 1 is a sectional view for schematically illustrating a configuration of an adhesive member according to a first embodiment.

An adhesive member, an adhesion method, and a method of manufacturing an electronic device casing according to a first embodiment are described. FIG. 1 is a sectional view for schematically illustrating a configuration of an adhesive member 11 according to this embodiment. As illustrated in FIG. 1, the adhesive member 11 according to this embodiment includes a first pin portion 30, a second pin portion 40, and a flange portion 50. The adhesive member 11 is a member used for adhesion between a first adherend member 100 and a second adherend member 110 described later.

The first pin portion 30 has, for example, a columnar shape. An axial direction of the first pin portion 30 is an up-and-down direction in FIG. 1. The first pin portion 30 includes a bottom portion 31, a distal end portion 32, and a side surface 33. The bottom portion 31 is one axial end portion of the first pin portion 30, and is an end portion connected to the second pin portion 40. The distal end portion 32 is the other axial end portion of the first pin portion 30. The distal end portion 32 is located below the bottom portion 31 in FIG. 1. The distal end portion 32 is formed in a flat surface shape perpendicular to the axial direction. The side surface 33 is located between the bottom portion 31 and the distal end portion 32, and is formed in a cylindrical surface shape. A portion between the side surface 33 and the distal end portion 32 is round-chamfered as required. The first pin portion 30 is inserted into a first hole 101, which is described later, formed in the first adherend member 100 from the distal end portion 32 side. The first pin portion 30 is formed using metal or resin. Similarly to the flange portion 50, the first pin portion 30 may be formed using an adhesive.

The second pin portion 40 is formed integrally with the first pin portion 30, and has a columnar shape coaxial with the first pin portion 30. The second pin portion 40 has a diameter φ2 larger than a diameter φ1 of the first pin portion 30. The second pin portion 40 includes a bottom portion 41, a distal end portion 42, and a side surface 43. The bottom portion 41 is one axial end portion of the second pin portion 40, and is an end portion connected to the first pin portion 30. The distal end portion 42 is the other axial end portion of the second pin portion 40. The distal end portion 42 is located above the bottom portion 41 in FIG. 1. The distal end portion 42 is formed in a flat surface shape perpendicular to the axial direction. The side surface 43 is located between the bottom portion 41 and the distal end portion 42, and is formed in a cylindrical surface shape. A portion between the side surface 43 and the distal end portion 42 is round-chamfered as required.

An inner peripheral portion of the bottom portion 41 of the second pin portion 40 is connected to the bottom portion 31 of the first pin portion 30. An annular step surface 41a is formed on an outer peripheral portion of the bottom portion 41 by a difference between the diameter φ2 of the second pin portion 40 and the diameter φ1 of the first pin portion 30. The step surface 41a is a flat surface perpendicular to the axial direction of the second pin portion 40. The second pin portion 40 is inserted into a second hole 111, which is described later, formed in the second adherend member 110 from the distal end portion 42 side. The second pin portion 40 is inserted into the second hole 111 of the second adherend member 110 after the first pin portion 30 is inserted into the first hole 101 of the first adherend member 100. The second pin portion 40 is formed using, for example, the same material as the first pin portion 30.

The first pin portion 30 and the second pin portion 40 mainly have a function to perform positional alignment of the first adherend member 100 and the second adherend member 110. It is preferred that the first pin portion 30 and the second pin portion 40 have a strength that withstands stress generated between the first adherend member 100 and the second adherend member 110 in a period until an adhesive layer 60 described later is formed between the first adherend member 100 and the second adherend member 110. After the adhesive layer 60 is formed, the strength of an adherend in which the first adherend member 100 and the second adherend member 110 are adhered to each other is obtained by the adhesive layer 60. Thus, the first pin portion 30 and the second pin portion 40 are not required to be treated as a strength member for obtaining the strength of the adherend.

The flange portion 50 is mounted to the side surface 43 of the second pin portion 40 in a flange shape. The flange portion 50 is formed, for example, in an annular shape so as to surround the entire periphery of the side surface 43. The flange portion 50 is formed using an adhesive. The flange portion 50 is in a solid state at normal temperature, for example, at 27° C. That is, the state of the adhesive forming the flange portion 50 at normal temperature is a solid or a fluid having a high viscosity to such a degree that its own shape is maintained. The adhesive forming the flange portion 50 is not easily deformed only by contact with the first adherend member 100 and the second adherend member 110, which are described later, and has a property that a high adhesive strength is not exhibited at normal temperature. As the adhesive, for example, a reaction-curable hot-melt adhesive or a thermosetting adhesive which is solid at normal temperature is used.

The flange portion 50 is formed in a plate shape along a plane perpendicular to the axial direction of the first pin portion 30 and the second pin portion 40. The flange portion 50 includes a surface 51 located on the first pin portion 30 side, and a surface 52 located on a side opposite to the surface 51. The surface 51 is formed, for example, on the same plane as the step surface 41a. A thickness of the flange portion 50 in the axial direction is smaller than a length of the second pin portion 40 in the axial direction. Further, the thickness of the flange portion 50 in the axial direction is larger than a thickness of the adhesive layer 60 described later. The flange portion 50 may be mounted to the side surface 33 of the first pin portion 30. Further, the flange portion 50 may be mounted across the side surface 33 and the side surface 43.

Next, a process of adhering the first adherend member 100 and the second adherend member 110 to each other using the adhesive members 11 according to this embodiment is described. FIG. 2 to FIG. 5 are sectional views for illustrating a flow of a process of adhering the first adherend member 100 and the second adherend member 110 to each other using the adhesive members 11 according to this embodiment. In FIG. 2 to FIG. 5, two adhesive members 11 are used for the adhesion between the first adherend member 100 and the second adherend member 110, but the number of the adhesive members 11 may be three or more. Further, both the first adherend member 100 and the second adherend member 110 illustrated in FIG. 2 to FIG. 5 have a flat plate shape, but the shapes of the first adherend member 100 and the second adherend member 110 are not limited to the flat plate shape.

Figure 2:
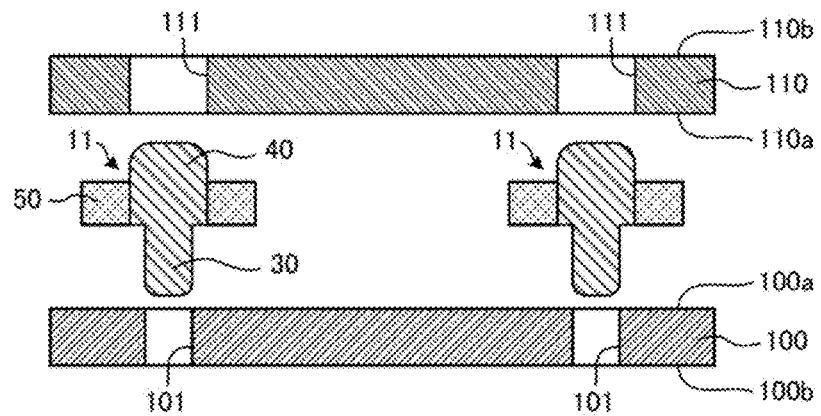
FIG. 2 is a sectional view for illustrating a flow of a process of adhering a first adherend member and a second adherend member to each other using the adhesive members according to the first embodiment.

As illustrated in FIG. 2, the first holes 101 are formed in a surface 100a being an adhesion surface of the first adherend member 100. The first holes 101 are each a hole into which the first pin portion 30 of the adhesive member 11 is to be inserted so as to perform positional alignment of the first adherend member 100 and the second adherend member 110. The first holes 101 penetrate from the surface 100a to a surface 100b which is a surface opposite to the surface 100a. That is, a depth dimension of the first hole 101 is equal to a distance between the surface 100a and the surface 100b. The depth dimension of the first hole 101 is smaller than a length dimension of the first pin portion 30 in the axial direction. The first pin portion 30 is formed, for example, so as to have a fitting relationship with the first hole 101. Examples of the fitting relationship include clearance fitting, interference fitting, and intermediate fitting are given. Further, the first hole 101 has a diameter smaller than the diameter φ2 of the second pin portion 40. Although the two first holes 101 are illustrated in FIG. 2, the number of the first holes 101 may be three or more.

The second holes 111 are formed in a surface 110a being an adhesion surface of the second adherend member 110. The second holes 111 are each a hole into which the second pin portion 40 of the adhesive member 11 is to be inserted so as to perform positional alignment of the first adherend member 100 and the second adherend member 110. The second holes 111 penetrate from the surface 110a to a surface 110b which is a surface opposite to the surface 110a. That is, a depth dimension of the second hole 111 is equal to a distance between the surface 110a and the surface 110b. The depth dimension of the second hole 111 is smaller than a length dimension of the second pin portion 40 in the axial direction. Although the two second holes 111 are illustrated in FIG. 2, the number of the second holes 111 may be three or more.

Figure 3:
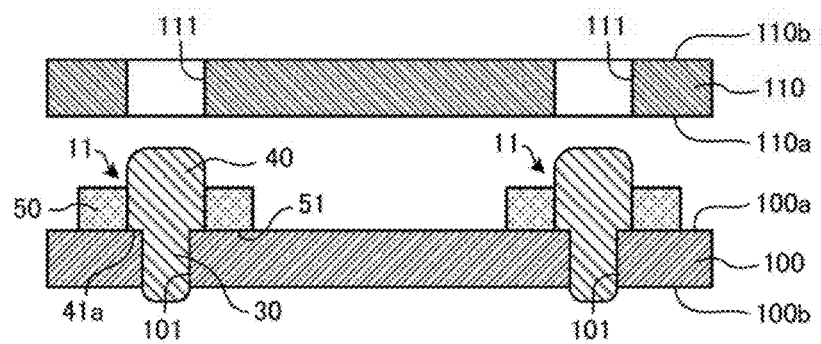
FIG. 3 is a sectional view for illustrating a flow of a process of adhering the first adherend member and the second adherend member to each other using the adhesive members according to the first embodiment.

In the process of adhering the first adherend member 100 and the second adherend member 110 to each other, first, as illustrated in FIG. 3, the first pin portion 30 of each adhesive member 11 is inserted into the first hole 101 of the first adherend member 100. An insertion depth of the first pin portion 30 is limited to a certain depth by contact of the step surface 41a of the second pin portion 40 or the surface 51 of the flange portion 50 with the surface 100a of the first adherend member 100. When the first pin portion 30 and the first hole 101 are in a fitting relationship, the first pin portion 30 can be prevented from easily coming off from the first hole 101. Thus, at least in a process from insertion of the first pin portion 30 into the first hole 101 to formation of the adhesive layer 60, the adhesive member 11 can be fixed to the first adherend member 100. Through insertion of the first pin portion 30 into the first hole 101, the flange portion 50 formed using an adhesive is arranged on the surface 100a of the first adherend member 100.

Figure 4:
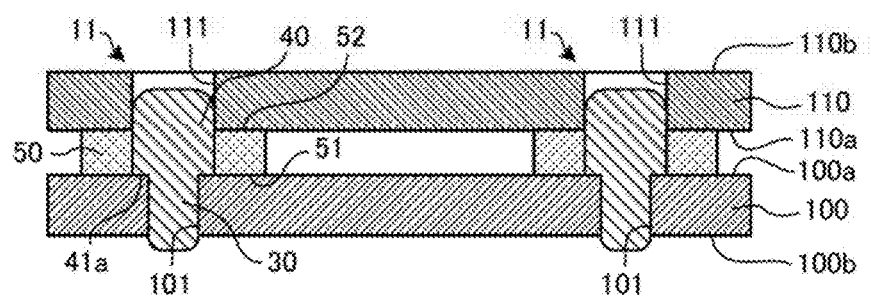
FIG. 4 is a sectional view for illustrating a flow of a process of adhering the first adherend member and the second adherend member to each other using the adhesive members according to the first embodiment.

Next, as illustrated in FIG. 4, the surface 110a of the second adherend member 110 is opposed to the surface 100a of the first adherend member 100, and a portion protruding from the flange portion 50 in the second pin portion 40 of each adhesive member 11 is inserted into the second hole 111 of the second adherend member 110. As a result, planar positional alignment of the first adherend member 100 and the second adherend member 110 is performed. An insertion depth of the second pin portion 40 at this point is limited to a certain depth by contact of the surface 52 of the flange portion 50 with the surface 110a of the second adherend member 110.

In the state illustrated in FIG. 4, the flange portion 50 is sandwiched by the surface 100a of the first adherend member 100 and the surface 110a of the second adherend member 110. In this state, a high adhesive strength is not exhibited in the adhesive forming the flange portion 50. Thus, before the curing of the adhesive progresses, the second adherend member 110 can be temporarily removed from the first adherend member 100. Thus, even after the second adherend member 110 is temporarily placed on the first adherend member 100, and the second adherend member 110 is brought into contact with the flange portion 50, fine adjustment of the position of the second adherend member 110 can be easily performed. Thus, positional alignment of the first adherend member 100 and the second adherend member 110 can be performed accurately and easily.

Figure 5:
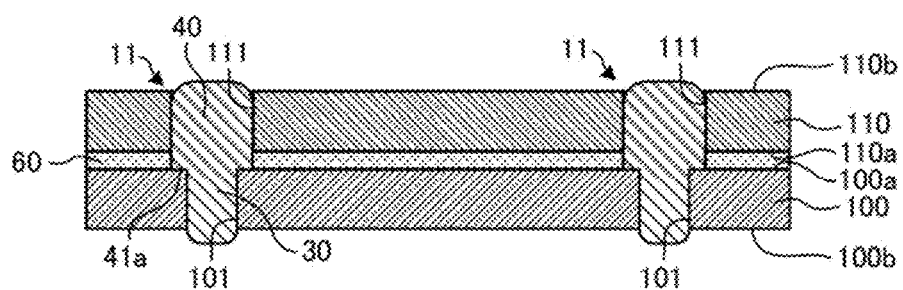
FIG. 5 is a sectional view for illustrating a flow of a process of adhering the first adherend member and the second adherend member to each other using the adhesive members according to the first embodiment.

Next, as illustrated in FIG. 5, the adhesive layer 60 is formed between the first adherend member 100 and the second adherend member 110. For example, when the flange portion 50 is formed using a thermosetting adhesive, the flange portion 50 is heated. When the thermosetting adhesive is heated, the viscosity of the thermosetting adhesive is once lowered so that fluidity is given to the thermosetting adhesive. When the thermosetting adhesive flows, the planar formation range of the flange portion 50 is increased, and a thickness of the flange portion 50 is reduced. After that, the thermosetting adhesive is cured by heat. As a result, the adhesive layer 60 illustrated in FIG. 5 is formed between the first adherend member 100 and the second adherend member 110. When the flange portion 50 is to be heated, a method of entirely heating the first adherend member 100 and the second adherend member 110 in a thermostatic chamber or a method of locally hating the vicinity of the adhesive member 11 by a small-sized heater or a small-sized lamp is used.

When the flange portion 50 is formed using a hot-melt adhesive, the hot-melt adhesive is melted by heating the flange portion 50. As a result, the planar formation range of the flange portion 50 is increased, and the thickness of the flange portion 50 is reduced. After that, the flange portion 50 is cooled up to normal temperature so that the hot-melt adhesive is cured. As a result, the adhesive layer 60 illustrated in FIG. 5 is formed between the first adherend member 100 and the second adherend member 110.

The surplus of the melted adhesive flows into the gap between the first pin portion 30 and the first hole 101 and the gap between the second pin portion 40 and the second hole 111 to be cured. As a result, the side surface 33 of the first pin portion 30 and an inner wall surface of the first hole 101 are firmly fixed to each other, and the gap between the first pin portion 30 and the first hole 101 is closed. Further, the side surface 43 of the second pin portion 40 and an inner wall surface of the second hole 111 are firmly fixed to each other, and the gap between the second pin portion 40 and the second hole 111 is closed. As a result, the sealability and the rigidity of the adherend in which the first adherend member 100 and the second adherend member 110 are adhered to each other can be improved.

Each of the first pin portion 30 and the second pin portion 40 may have a groove or a hole for allowing flow of the adhesive. The groove is formed in each of the side surface 33 of the first pin portion 30 and the side surface 43 of the second pin portion 40. The hole is formed through each of the first pin portion 30 and the second pin portion 40. With the formation of the groove or the hole, the flow of the surplus of the adhesive can be effectively controlled. Thus, the gap between the first pin portion 30 and the first hole 101 and the gap between the second pin portion 40 and the second hole 111 can be more reliably closed by the adhesive.

When a closed-cell adhesive that expands during curing, that is, an adhesive that expands into closed-cell foam during curing is used, the adhesive that flows into the gap between the first pin portion 30 and the first hole 101 and the gap between the second pin portion 40 and the second hole 111 expands to be cured. As a result, those gaps can be reliably closed, thereby being capable of further improving the sealability of the adherend.

Further, when the flange portion 50 is formed using an adhesive of a type that requires application of pressure, the first adherend member 100 and the second adherend member 110 are pressed in a direction in which the first adherend member 100 and the second adherend member 110 approach each other. When the flange portion 50 is pressed, the planar formation range of the flange portion 50 is increased, and the thickness of the flange portion 50 is reduced. As a result, the adhesive layer 60 illustrated in FIG. 5 is formed between the first adherend member 100 and the second adherend member 110.

Through the above process, the first adherend member 100 and the second adherend member 110 are adhered to each other through intermediation of the adhesive layer 60. In this embodiment, with use of the first pin portion 30 and the second pin portion 40 of the adhesive member 11 itself, positional alignment of the first adherend member 100 and the second adherend member 110 can be performed. Further, even after the second adherend member 110 is brought into contact with the flange portion 50, fine adjustment of the position of the second adherend member 110 can be performed. Thus, positional alignment of the first adherend member 100 and the second adherend member 110 can be performed accurately and easily. Further, in this embodiment, positional alignment of the first adherend member 100 and the second adherend member 110 can be performed without additionally using a positioning pin. Thus, the quality of the adherend can be improved while suppressing manufacturing cost of the adherend in which the first adherend member 100 and the second adherend member 110 are adhered to each other.

Figure 6:
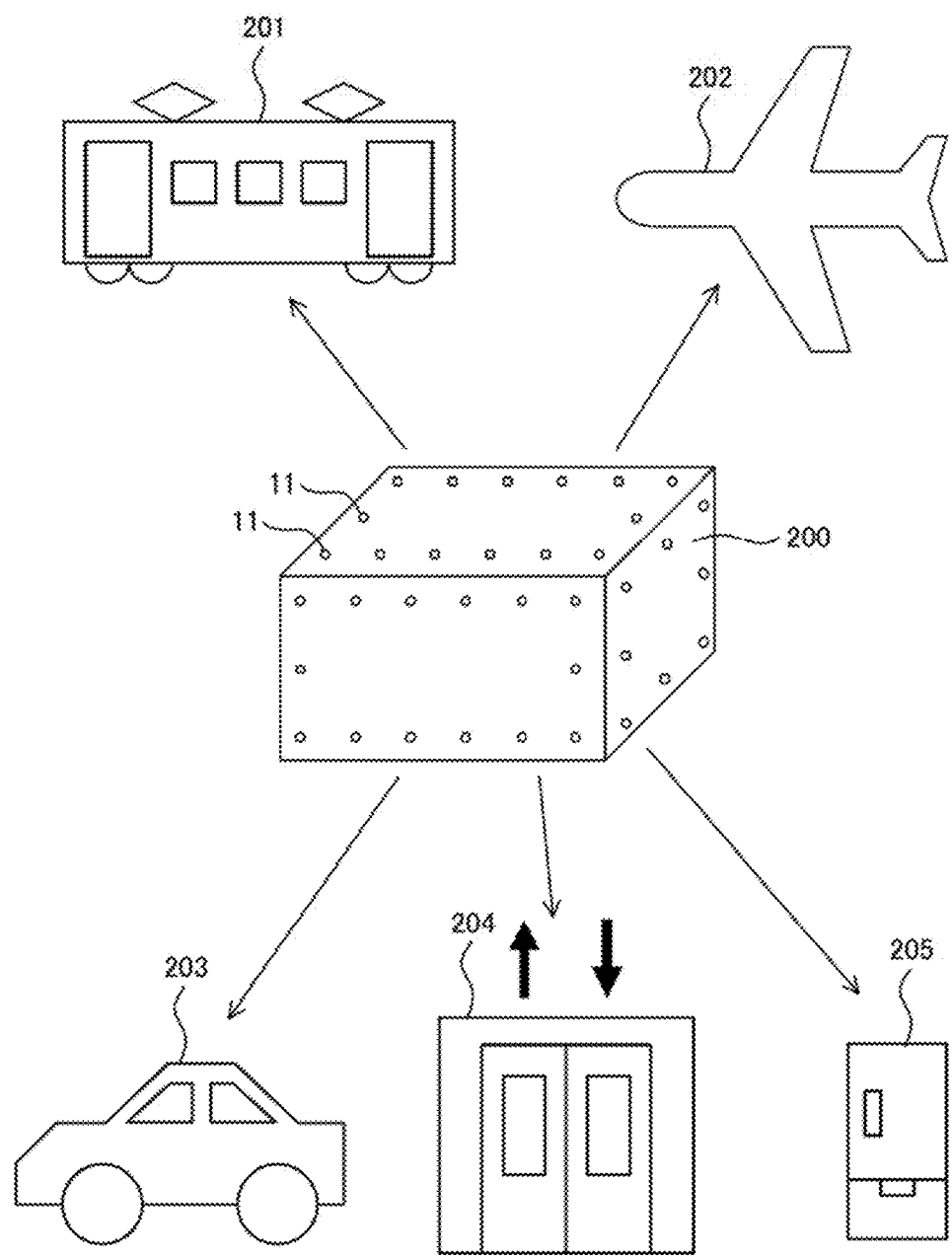
FIG. 6 is a view for illustrating a schematic configuration of an electronic device casing manufactured using the adhesive members according to the first embodiment, and application examples of the electronic device casing.

The adhesive member 11 according to this embodiment can be used in, for example, the process of adhering the adherend members to each other in a manufacturing process of the electronic device casing. FIG. 6 is a view for illustrating a schematic configuration of an electronic device casing 200 manufactured using the adhesive members 11 according to this embodiment, and application examples of the electronic device casing 200. As illustrated in FIG. 6, the electronic device casing 200 is formed by adhering the adherend members to each other using a plurality of adhesive members 11. The electronic device casing 200 accommodates electric components therein. The electronic device casing 200 is mounted to, for example, a railway vehicle 201, an aircraft 202, an automobile 203, an elevating machine 204, or a household electrical appliance 205.

As described above, the adhesive member 11 according to this embodiment includes the first pin portion 30, the second pin portion 40, and the flange portion 50. The first pin portion is inserted into the first hole 101 formed in the first adherend member 100. The second pin portion 40 is inserted into the second hole 111 formed in the second adherend member 110 to be adhered to the first adherend member 100. The second pin portion 40 is formed coaxially with the first pin portion 30. The flange portion 50 is formed using an adhesive. The flange portion 50 is mounted to the side surface 33 of the first pin portion 30 or the side surface 43 of the second pin portion 40 in the flange shape.

According to this configuration, with use of the first pin portion 30 and the second pin portion 40 of the adhesive member 11 itself, positional alignment of the first adherend member 100 and the second adherend member 110 can be performed. Thus, positional alignment of the first adherend member 100 and the second adherend member 110 can be performed accurately and easily.

In the adhesive member 11 according to this embodiment, the diameter φ1 of the first pin portion 30 is smaller than the diameter φ2 of the second pin portion 40. According to this configuration, the insertion depth of the first pin portion 30 with respect to the first hole 101 can be limited to a certain depth.

In the adhesive member 11 according to this embodiment, each of the first pin portion 30 and the second pin portion 40 is formed using metal or resin. According to this configuration, the strength of each of the first pin portion 30 and the second pin portion 40 can be improved. Further, each of the first pin portion 30 and the second pin portion 40 may be formed using an adhesive.

In the adhesive member 11 according to this embodiment, the first pin portion 30 is formed so as to have a fitting relationship with the first hole 101. According to this configuration, the first pin portion 30 can be prevented from easily coming off from the first hole 101. Further, in the adhesive member 11 according to this embodiment, the second pin portion 40 may be formed so as to have a fitting relationship with the second hole 111.

In the adhesive member 11 according to this embodiment, the first pin portion 30 has the groove formed in the side surface or the hole formed through the first pin portion 30. According to this configuration, the flow of the adhesive can be effectively controlled. Further, in the adhesive member 11 according to this embodiment, the second pin portion 40 may have a groove formed in the side surface or a hole formed through the second pin portion 40.

In the adhesive member 11 according to this embodiment, the flange portion 50 is in the solid state at normal temperature. According to this configuration, the adhesive member 11 can be easily handled. Further, according to this configuration, the second adherend member 110 in contact with the flange portion 50 can be prevented from sticking to the flange portion 50.

In the adhesive member 11 according to this embodiment, the flange portion 50 is formed using the thermosetting adhesive or the hot-melt adhesive. According to this configuration, fluidity can be given by heating the flange portion 50, thereby being capable of forming the adhesive layer 60 between the first adherend member 100 and the second adherend member 110.

In the adhesive member 11 according to this embodiment, the flange portion 50 is formed using the closed-cell adhesive that expands during curing. According to this configuration, the gap between the first pin portion 30 and the first hole 101 and the gap between the second pin portion 40 and the second hole 111 can be reliably closed.

The adhesion method according to this embodiment includes adhering the first adherend member 100 and the second adherend member 110 to each other using the adhesive member 11 according to this embodiment. According to this configuration, with use of the first pin portion 30 and the second pin portion 40 of the adhesive member 11 itself, positional alignment of the first adherend member 100 and the second adherend member 110 can be performed. Thus, positional alignment of the first adherend member 100 and the second adherend member 110 can be performed accurately and easily.

The method of manufacturing an electronic device casing according to this embodiment includes manufacturing the electronic device casing 200 using the adhesion method according to this embodiment. According to this configuration, in a manufacturing process of the electronic device casing 200, positional alignment of the first adherend member 100 and the second adherend member 110 can be performed accurately and easily.

Second Embodiment

Figure 7:
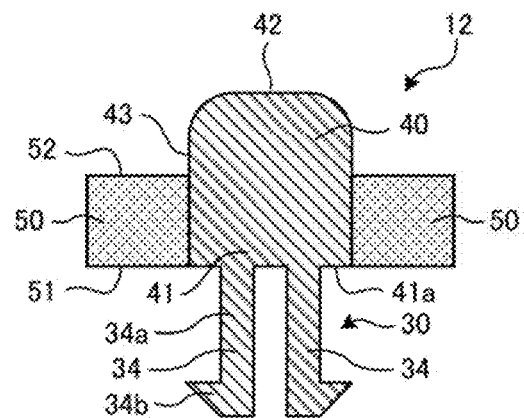
FIG. 7 is a sectional view for schematically illustrating a configuration of an adhesive member according to a second embodiment.

An adhesive member and an adhesion method according to a second embodiment are described. FIG. 7 is a sectional view for schematically illustrating a configuration of an adhesive member according to this embodiment. The adhesive member 12 according to this embodiment is different from the adhesive member 11 according to the first embodiment in the configuration of the first pin portion 30. Description of configurations similar to those of the first embodiment is omitted.

As illustrated in FIG. 7, the first pin portion 30 of the adhesive member 12 includes a pair of claw portions 34 to be fixed to the first adherend member 100. Each of the claw portions 34 includes a flexible portion 34a that extends from the bottom portion 41 of the second pin portion 40 along the axial direction and has flexibility, and a protruding portion 34b formed at a distal end of the flexible portion 34a. The flexible portion 34a passes through the first hole 101 when the first pin portion 30 is inserted into the first hole 101. The protruding portion 34b is caught on the surface 100b of the first adherend member 100 when the first pin portion 30 is inserted into the first hole 101. The number of the claw portions 34 may be three or more.

Figure 8:
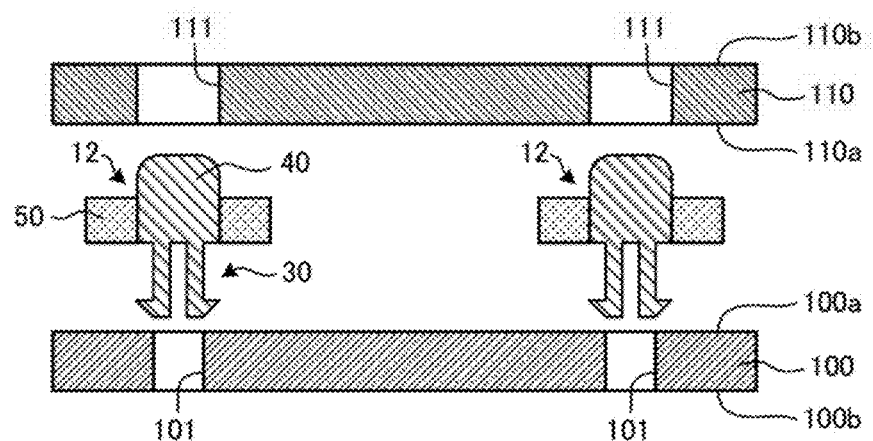
FIG. 8 is a sectional view for illustrating a flow of a process of adhering the first adherend member and the second adherend member to each other using the adhesive members according to the second embodiment.
Figure 9:
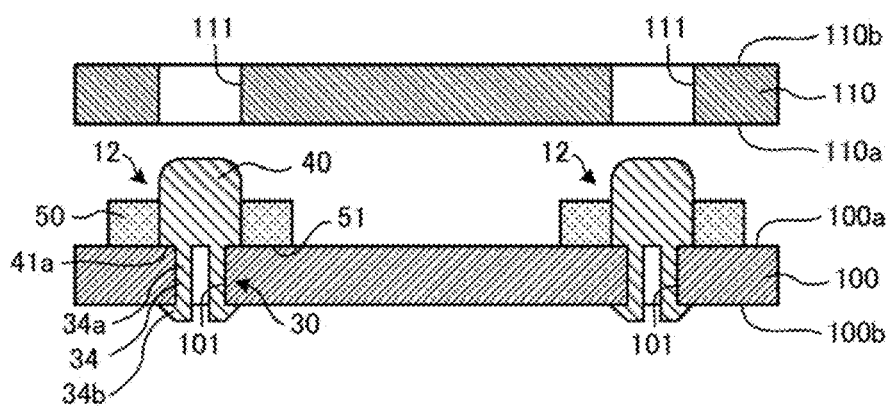
FIG. 9 is a sectional view for illustrating a flow of a process of adhering the first adherend member and the second adherend member to each other using the adhesive members according to the second embodiment.

FIG. 8 to FIG. 11 are sectional views for illustrating a flow of a process of adhering the first adherend member 100 and the second adherend member 110 to each other using the adhesive members 12 according to this embodiment. In the process of adhering the first adherend member 100 and the second adherend member 110 to each other, first, as illustrated in FIG. 8 and FIG. 9, the first pin portion 30 of each adhesive member 12 is inserted into the first hole 101 of the first adherend member 100. An insertion depth of the first pin portion 30 is limited to a certain depth by contact of the step surface 41a of the second pin portion 40 or the surface 51 of the flange portion with the surface 100a of the first adherend member 100. Further, the protruding portion 34b is caught on the surface 100b of the first adherend member 100. As a result, in a process from insertion of the first pin portion 30 into the first hole 101 to formation of the adhesive layer 60, the adhesive member can be fixed to the first adherend member 100. Through insertion of the first pin portion 30 into the first hole 101, the flange portion 50 formed using an adhesive is arranged on the surface 100a of the first adherend member 100.

Figure 10:
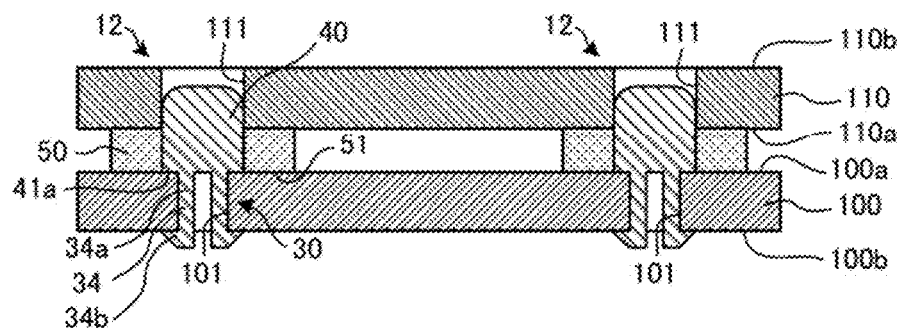
FIG. 10 is a sectional view for illustrating a flow of a process of adhering the first adherend member and the second adherend member to each other using the adhesive members according to the second embodiment.
Figure 11:
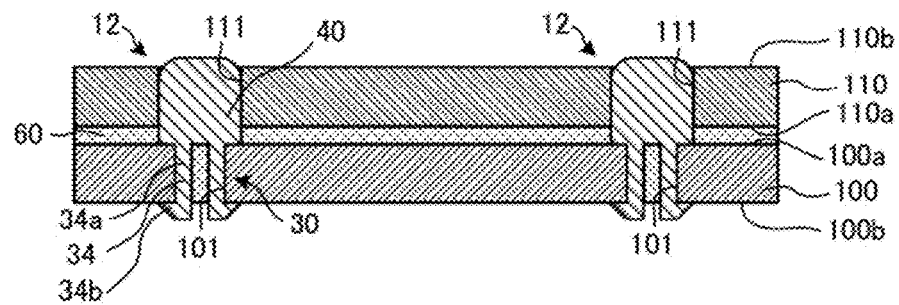
FIG. 11 is a sectional view for illustrating a flow of a process of adhering the first adherend member and the second adherend member to each other using the adhesive members according to the second embodiment.

The process illustrated in FIG. 10 and FIG. 11 is the same as the process of the first embodiment illustrated FIG. 4 and FIG. 5, and hence description thereof is omitted. When the flange portion 50 is formed using a hot-melt adhesive, the adhesive melted by heat flows not only into the gap between the first pin portion 30 and the first hole 101 and the gap between the second pin portion 40 and the second hole 111, but also into the gap between the pair of claw portions 34 to be cured.

As described above, in the adhesive member 12 according to this embodiment, the first pin portion 30 includes the claw portions 34 so as to be fixed to the first adherend member 100. According to this configuration, the first pin portion 30 can be prevented from easily coming off from the first hole 101.

Third Embodiment

Figure 12:
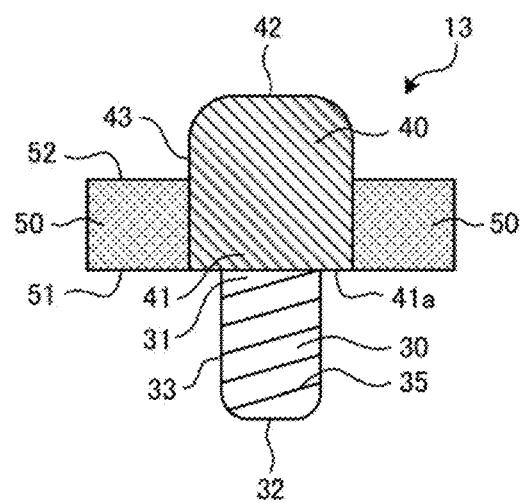
FIG. 12 is a sectional view for schematically illustrating a configuration of an adhesive member according to a third embodiment.

An adhesive member and an adhesion method according to a third embodiment are described. FIG. 12 is a sectional view for schematically illustrating a configuration of an adhesive member according to this embodiment. The adhesive member 13 according to this embodiment is different from the adhesive member 11 according to the first embodiment in the configuration of the first pin portion 30. Description of configurations similar to those of the first or second embodiment is omitted.

As illustrated in FIG. 12, the first pin portion 30 of the adhesive member 13 has a male thread portion 35. The male thread portion 35 has a configuration in which a male thread and a thread groove are formed on the side surface 33 of the first pin portion 30.

Figure 13:
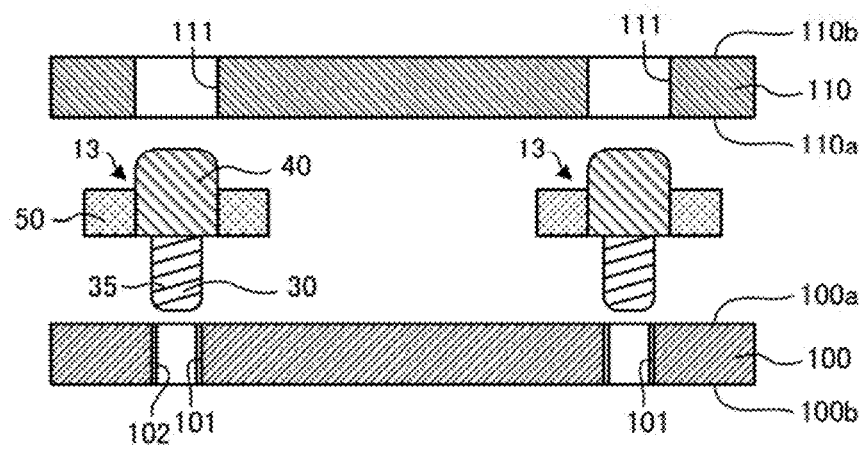
FIG. 13 is a sectional view for illustrating a flow of a process of adhering the first adherend member and the second adherend member to each other using the adhesive members according to the third embodiment.

FIG. 13 to FIG. 16 are sectional views for illustrating a flow of a process of adhering the first adherend member 100 and the second adherend member 110 to each other using the adhesive members 13 according to this embodiment. As illustrated in FIG. 13, the first hole 101 of the first adherend member 100 has a female thread portion 102 formed on the inner wall surface of the first hole 101. The female thread portion 102 is formed to be fitted to the male thread portion 35.

Figure 14:
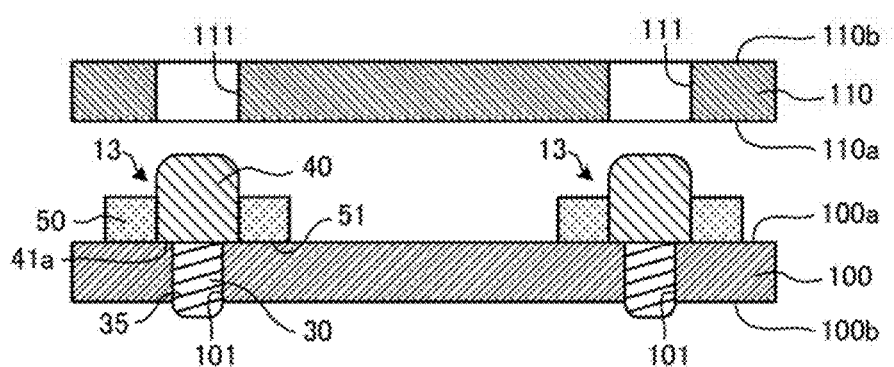
FIG. 14 is a sectional view for illustrating a flow of a process of adhering the first adherend member and the second adherend member to each other using the adhesive members according to the third embodiment.

In the process of adhering the first adherend member 100 and the second adherend member 110 to each other, first, as illustrated in FIG. 14, the first pin portion 30 of each adhesive member 13 is inserted into the first hole 101 of the first adherend member 100. At this time, the male thread portion 35 of the first pin portion 30 is screwed into the female thread portion 102 of the first hole 101. As a result, the adhesive member 13 is coupled to the first adherend member 100 by the threads. Thus, in a process from insertion of the first pin portion 30 into the first hole 101 to formation of the adhesive layer 60, the adhesive member 13 can be fixed to the first adherend member 100. Through insertion of the first pin portion 30 into the first hole 101, the flange portion 50 formed using an adhesive is arranged on the surface 100a of the first adherend member 100.

Figure 15:
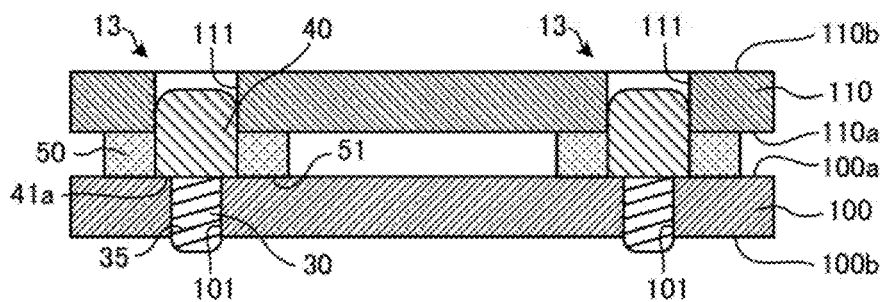
FIG. 15 is a sectional view for illustrating a flow of a process of adhering the first adherend member and the second adherend member to each other using the adhesive members according to the third embodiment.
Figure 16:
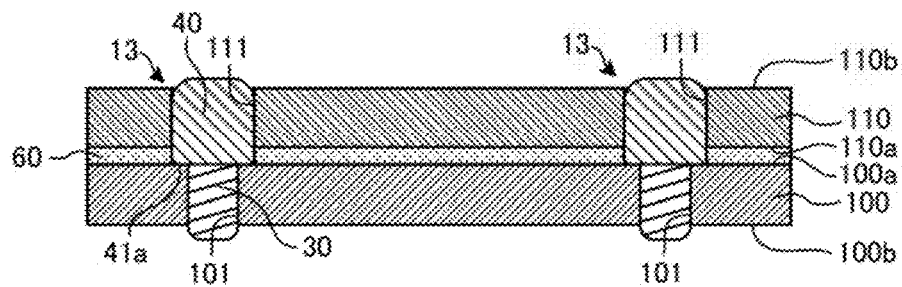
FIG. 16 is a sectional view for illustrating a flow of a process of adhering the first adherend member and the second adherend member to each other using the adhesive members according to the third embodiment.

The process illustrated in FIG. 15 and FIG. 16 is the same as the process of the first embodiment illustrated FIG. 4 and FIG. 5, and hence description thereof is omitted.

As described above, in the adhesive member 13 according to this embodiment, the first pin portion 30 has the male thread portion 35. According to this configuration, the first pin portion 30 can be prevented from easily coming off from the first hole 101.

Fourth Embodiment

Figure 17:
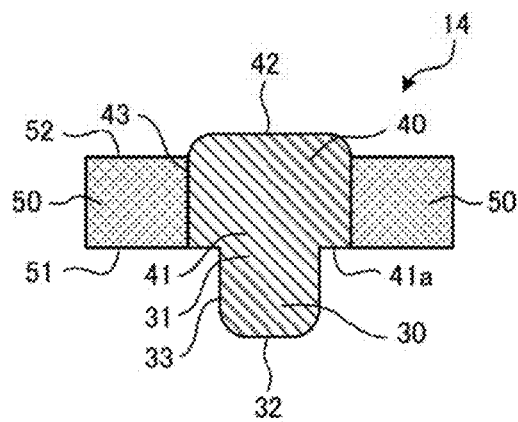
FIG. 17 is a sectional view for schematically illustrating a configuration of an adhesive member according to a fourth embodiment.

An adhesive member and an adhesion method according to a fourth embodiment are described. FIG. 17 is a sectional view for schematically illustrating a configuration of an adhesive member 14 according to this embodiment. The adhesive member 14 according to this embodiment is different from the adhesive member 11 according to the first embodiment in a length dimension of each of the first pin portion 30 and the second pin portion 40. Description of configurations similar to those of any of the first to third embodiments is omitted.

As illustrated in FIG. 17, a length dimension of the first pin portion 30 of this embodiment in the axial direction is smaller than the length dimension of the first pin portion 30 of the first embodiment in the axial direction. Further, a length dimension of the second pin portion 40 of this embodiment in the axial direction is smaller than the length dimension of the second pin portion 40 of the first embodiment in the axial direction.

Figure 18:
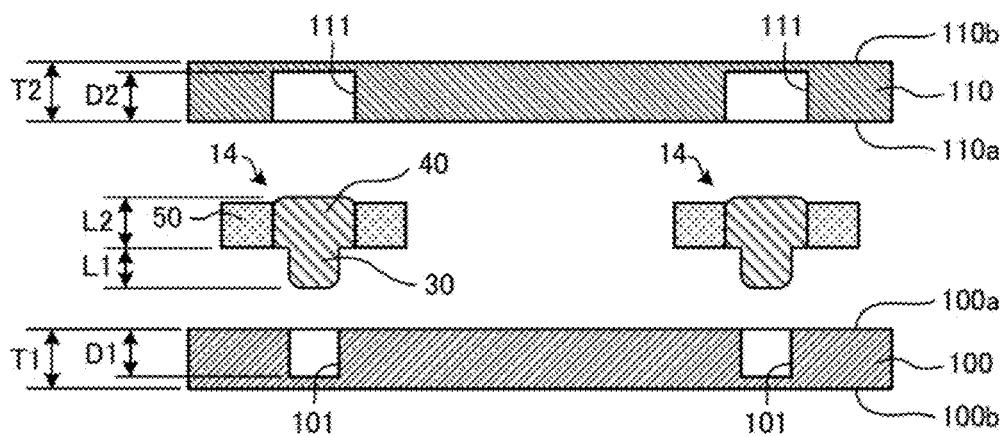
FIG. 18 is a sectional view for illustrating a flow of a process of adhering the first adherend member and the second adherend member to each other using the adhesive members according to the fourth embodiment.

FIG. 18 to FIG. 21 are sectional views for illustrating a flow of a process of adhering the first adherend member 100 and the second adherend member 110 to each other using the adhesive members 14 according to this embodiment. As illustrated in FIG. 18, the first holes 101 are formed in the surface 100a of the first adherend member 100. The first holes 101 do not penetrate up to the surface 100b of the first adherend member 100. That is, a depth dimension D1 of the first hole 101 is smaller than a thickness dimension T1 of the first adherend member 100 (D1<T1). Further, a length dimension L1 of the first pin portion 30 is smaller than the depth dimension D1 of the first hole 101 (L1<D1).

The second holes 111 are formed in the surface 110a of the second adherend member 110. The second holes 111 do not penetrate up to the surface 110b of the second adherend member 110. That is, a depth dimension D2 of the second hole 111 is smaller than a thickness dimension T2 of the second adherend member 110 (D2<T2). Further, a length dimension L2 of the second pin portion 40 is smaller than the depth dimension D2 of the second hole 111 (L2<D2).

Although both the relationships of L1<D1 and L2<D2 are satisfied in this embodiment, it is only required that at least one of the relationship of L1<D1 or the relationship of L2<D2 be satisfied.

Figure 19:
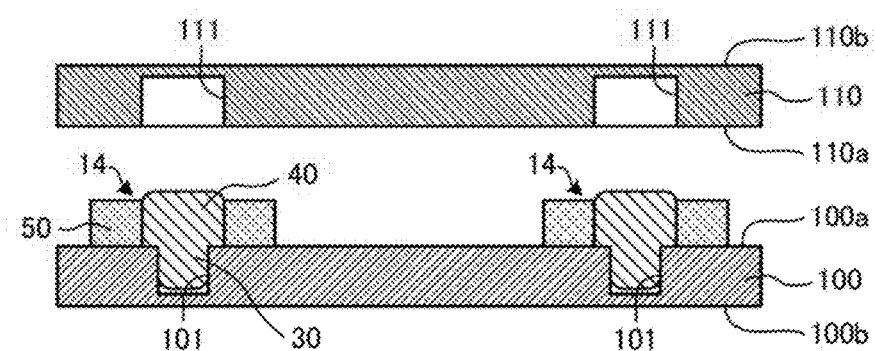
FIG. 19 is a sectional view for illustrating a flow of a process of adhering the first adherend member and the second adherend member to each other using the adhesive members according to the fourth embodiment.

In the process of adhering the first adherend member 100 and the second adherend member 110 to each other, first, as illustrated in FIG. 19, the first pin portion 30 of each adhesive member 14 is inserted into the first hole 101 of the first adherend member 100.

Figure 20:
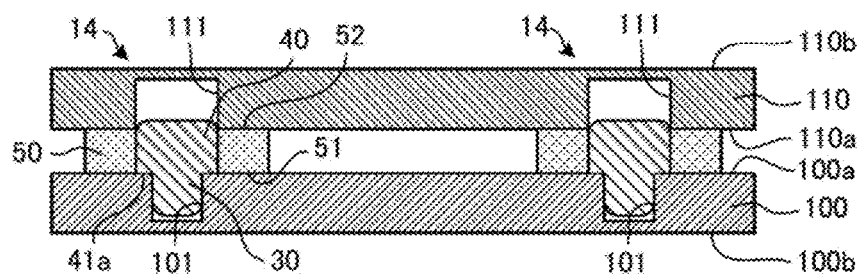
FIG. 20 is a sectional view for illustrating a flow of a process of adhering the first adherend member and the second adherend member to each other using the adhesive members according to the fourth embodiment.

Next, as illustrated in FIG. 20, the surface 110a of the second adherend member 110 is opposed to the surface 100a of the first adherend member 100, and the second pin portion 40 of each adhesive member 14 is inserted into the second hole 111 of the second adherend member 110. As a result, planar positional alignment of the first adherend member 100 and the second adherend member 110 is performed. In this state, a high adhesive strength is not exhibited in the adhesive forming the flange portion 50. Thus, before the curing of the adhesive progresses, the second adherend member 110 can be temporarily removed from the first adherend member 100.

Figure 21:
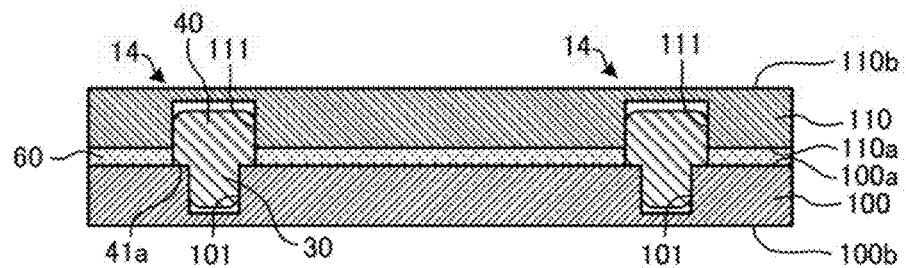
FIG. 21 is a sectional view for illustrating a flow of a process of adhering the first adherend member and the second adherend member to each other using the adhesive members according to the fourth embodiment.

Next, as illustrated in FIG. 21, the flange portion 50 is heated or pressed to form the adhesive layer 60 between the first adherend member 100 and the second adherend member 110. As a result, the first adherend member 100 and the second adherend member 110 are adhered to each other through intermediation of the adhesive layer 60.

As described above, in the adhesive member 14 according to this embodiment, the length dimension L1 of the first pin portion 30 is smaller than the depth dimension D1 of the first hole 101. According to this configuration, the first holes 101 can be formed so as not to penetrate the first adherend member 100, thereby being capable of suppressing reduction in the sealability and the rigidity of the first adherend member 100.

Fifth Embodiment

An adhesive member and an adhesion method according to a fifth embodiment are described. This embodiment is different from the first embodiment in that an additional adhesive 70 different from an adhesive member 15 is used in the process of adhering the first adherend member 100 and the second adherend member 110 to each other. Description of configurations similar to those of any of the first to fourth embodiments is omitted.

Figure 22:
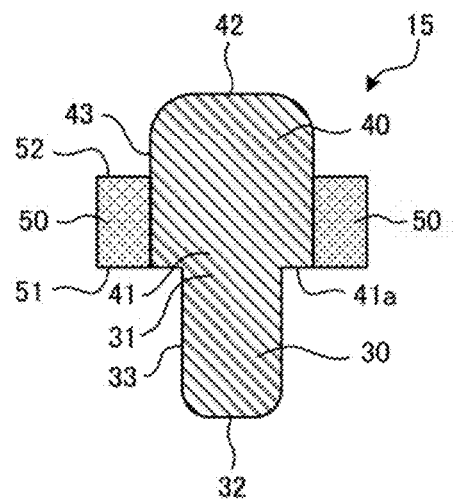
FIG. 22 is a sectional view for schematically illustrating a configuration of an adhesive member according to a fifth embodiment.

FIG. 22 is a sectional view for schematically illustrating a configuration of the adhesive member 15 according to this embodiment. As illustrated in FIG. 22, a flange portion 50 of the adhesive member 15 according to this embodiment is formed, for example, such that the area as viewed in the axial direction is smaller than that of the flange portion 50 of the first embodiment. A thickness of the flange portion 50 of this embodiment in the axial direction is equal to a thickness of the flange portion 50 of the first embodiment in the axial direction. As a result, a volume of the flange portion 50 of this embodiment is smaller than a volume of the flange portion 50 of the first embodiment.

Figure 23:
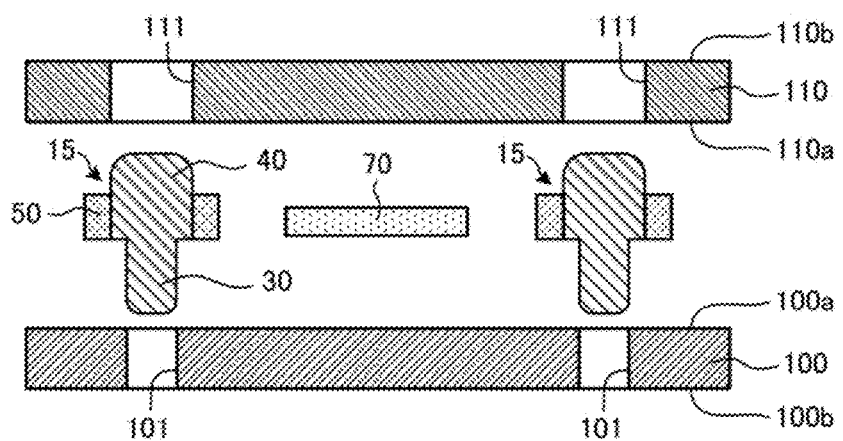
FIG. 23 is a sectional view for illustrating a flow of a process of adhering the first adherend member and the second adherend member to each other using the adhesive members according to the fifth embodiment.
Figure 24:
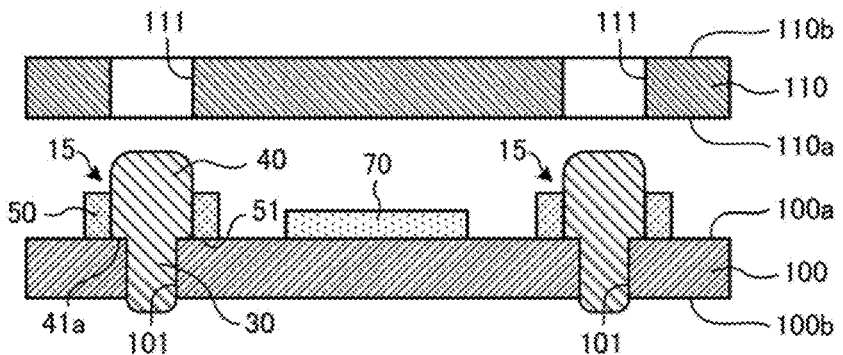
FIG. 24 is a sectional view for illustrating a flow of a process of adhering the first adherend member and the second adherend member to each other using the adhesive members according to the fifth embodiment.

FIG. 23 to FIG. 26 are sectional views for illustrating a flow of a process of adhering the first adherend member 100 and the second adherend member 110 to each other using the adhesive members 15 according to this embodiment. As illustrated in FIG. 23 and FIG. 24, in the process of adhering the first adherend member 100 and the second adherend member 110 to each other, the additional adhesive 70 different from the adhesive member 15 is arranged on the surface 100a of the first adherend member 100. The additional adhesive 70 is arranged at a portion of the surface 100a in which the adhesive member 15 is not arranged, for example, a portion between the two first holes 101 adjacent to each other. The additional adhesive 70 is arranged apart from the flange portions 50 of the adhesive members 15.

The thickness of the additional adhesive 70 is smaller than the thickness of the flange portion 50. The additional adhesive 70 may be in a solid state at normal temperature or in a liquid state at normal temperature. Further, the additional adhesive 70 may be easily deformed only by contact with the first adherend member 100 and the second adherend member 110. Further, the additional adhesive 70 may have a property that a high adhesive strength is exhibited at normal temperature. The type of the additional adhesive 70 is selected based on characteristics required for the adherend such as the sealability of the adherend to be manufactured and the strength of the adherend.

Figure 25:
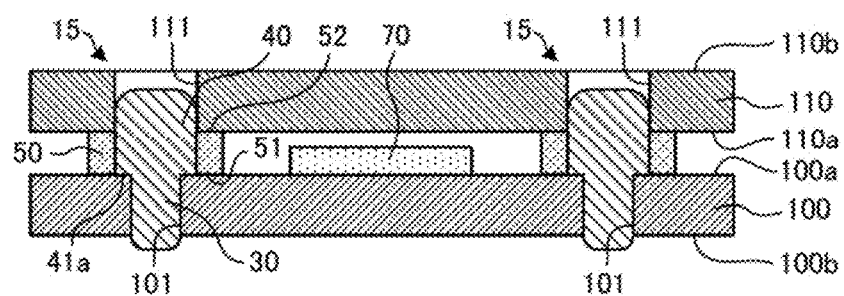
FIG. 25 is a sectional view for illustrating a flow of a process of adhering the first adherend member and the second adherend member to each other using the adhesive members according to the fifth embodiment.

Next, as illustrated in FIG. 25, the surface 110a of the second adherend member 110 is opposed to the surface 100a of the first adherend member 100, and the second pin portion 40 of each adhesive member 15 is inserted into the second hole 111 of the second adherend member 110. As a result, planar positional alignment of the first adherend member 100 and the second adherend member 110 is performed.

The flange portion 50 is sandwiched by the surface 100a of the first adherend member 100 and the surface 110a of the second adherend member 110. The thickness of the additional adhesive 70 is smaller than the thickness of the flange portion 50, and hence the additional adhesive 70 is not in contact with the surface 110a of the second adherend member 110. Thus, before curing of the adhesive forming the flange portion 50 progresses, the second adherend member 110 can be temporarily removed from the first adherend member 100.

Figure 26:
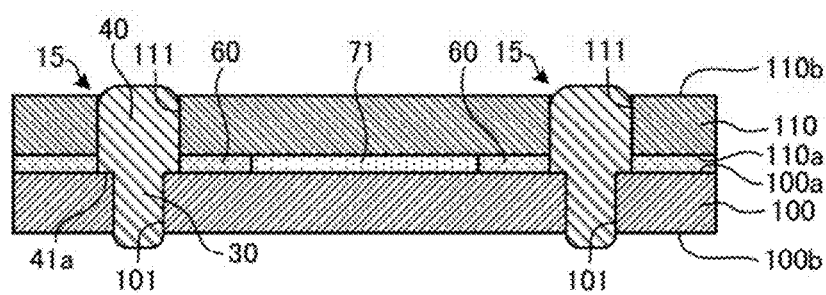
FIG. 26 is a sectional view for illustrating a flow of a process of adhering the first adherend member and the second adherend member to each other using the adhesive members according to the fifth embodiment.

Next, as illustrated in FIG. 26, the flange portion 50 is heated or pressed to form the adhesive layer 60 between the first adherend member 100 and the second adherend member 110. At this time, the thickness of the flange portion 50 is reduced so that the surface 110a of the second adherend member 110 is also in contact with the additional adhesive 70. Thus, further, the additional adhesive 70 is heated or pressed to cure the additional adhesive 70 and form an adhesive layer 71 between the first adherend member 100 and the second adherend member 110. As a result, the first adherend member 100 and the second adherend member 110 are adhered to each other through intermediation of the adhesive layer 60 and the adhesive layer 71.

In the first to fourth embodiments, one adhesive member is arranged for each set of the first hole 101 and the second hole 111. Thus, depending on the arrangement density of the first holes 101 on the surface 100a and the arrangement density of the second holes 111 on the surface 110a, the adhesive layers 60 may not be formed in a required range due to shortage of an adhesive. In this embodiment, the additional adhesives 70 are arranged in portions in which the adhesive members 15 are not arranged, thereby being capable of complementing an adhesive. As a result, the adhesive layer 71 can be formed in a complementary manner with respect to the adhesive layers 60 even in a portion apart from the adhesive member 15. Further, in this embodiment, the flange portion 50 of the adhesive member 15 can also be reduced in size.

Sixth Embodiment

Figure 27:
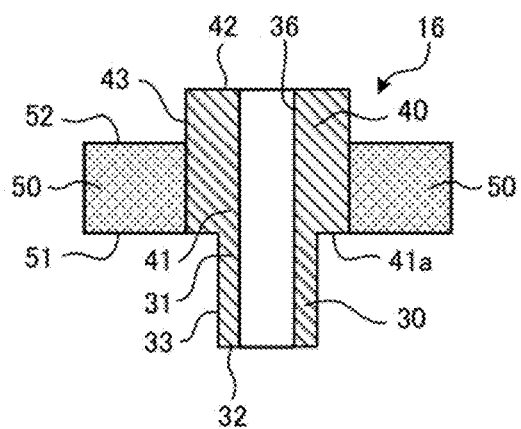
FIG. 27 is a sectional view for schematically illustrating a configuration of an adhesive member according to a sixth embodiment.

An adhesive member and an adhesion method according to a sixth embodiment are described. FIG. 27 is a sectional view for schematically illustrating a configuration of an adhesive member according to this embodiment. The adhesive member 16 according to this embodiment is different from the adhesive member 11 according to the first embodiment in the structure of each of the first pin portion 30 and the second pin portion 40. Description of configurations similar to those of any of the first to fifth embodiments is omitted.

As illustrated in FIG. 27, the first pin portion 30 and the second pin portion 40 of the adhesive member 16 according to this embodiment each have a through hole 36 that penetrates in the axial direction. The through hole 36 is formed at a central axis of each of the first pin portion 30 and the second pin portion 40.

Figure 28:
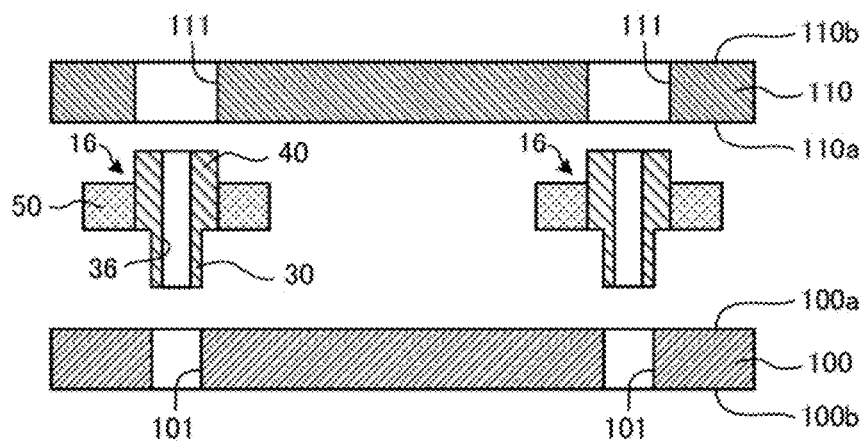
FIG. 28 is a sectional view for illustrating a flow of a process of adhering the first adherend member and the second adherend member to each other using the adhesive members according to the sixth embodiment.
Figure 29:
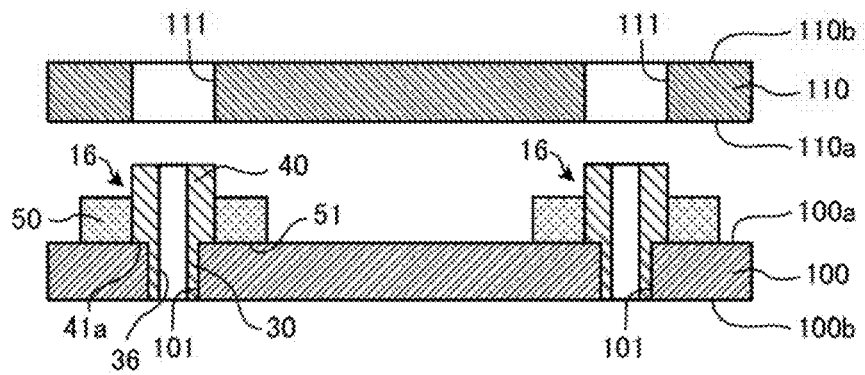
FIG. 29 is a sectional view for illustrating a flow of a process of adhering the first adherend member and the second adherend member to each other using the adhesive members according to the sixth embodiment.
Figure 30:
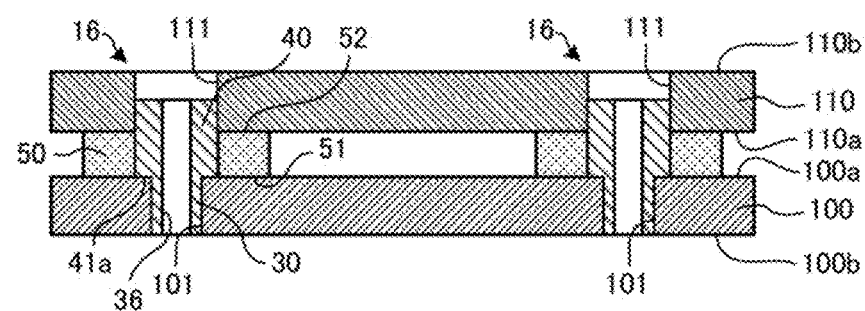
FIG. 30 is a sectional view for illustrating a flow of a process of adhering the first adherend member and the second adherend member to each other using the adhesive members according to the sixth embodiment.

FIG. 28 to FIG. 32 are sectional views for illustrating a flow of a process of adhering the first adherend member 100 and the second adherend member 110 to each other using the adhesive member 16 according to this embodiment. The process illustrated in FIG. 28 to FIG. 30 is the same as the process of the first embodiment illustrated FIG. 2 to FIG. 4, and hence description thereof is omitted.

Figure 31:
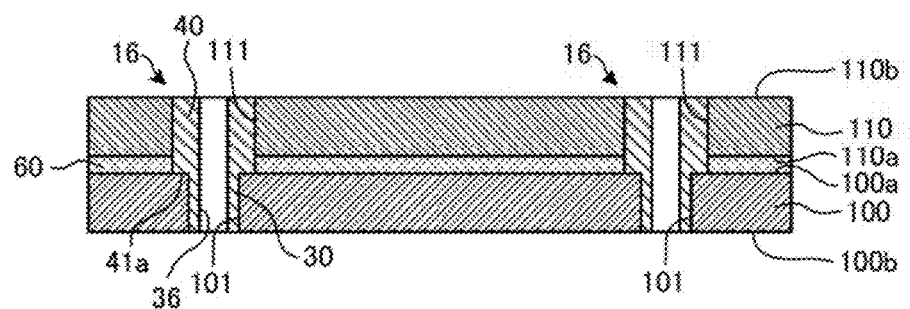
FIG. 31 is a sectional view for illustrating a flow of a process of adhering the first adherend member and the second adherend member to each other using the adhesive members according to the sixth embodiment.

In the process illustrated in FIG. 31, the flange portion 50 is heated or pressed to form the adhesive layer 60 between the first adherend member 100 and the second adherend member 110. In this embodiment, it is required to prevent the melted adhesive from flowing into the through hole 36. In order to control the flow of the adhesive, it is effective to form a groove or a hole in each of the first pin portion 30 and the second pin portion 40.

Figure 32:
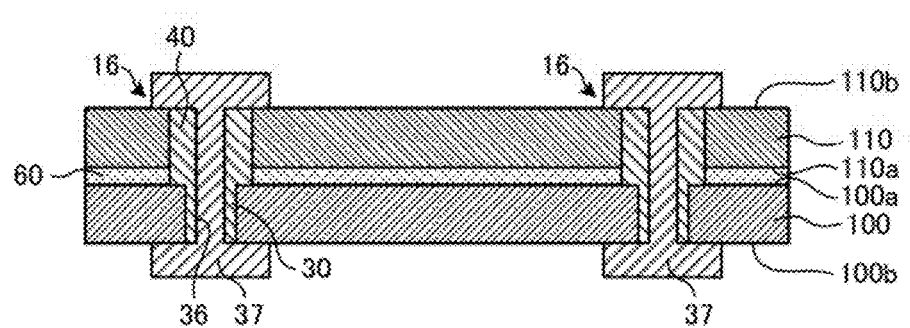
FIG. 32 is a sectional view for illustrating a flow of a process of adhering the first adherend member and the second adherend member to each other using the adhesive members according to the sixth embodiment.

Next, after a thickness of the adhesive layer 60 is reduced to a target thickness, as illustrated in FIG. 32, the first adherend member 100 and the second adherend member 110 are fastened to each other using a fastening member 37 inserted into the through hole 36. Examples of the fastening member 37 to be used include a bolt and a rivet. In this embodiment, the first adherend member 100 and the second adherend member 110 are not only adhered to each other through intermediation of the adhesive layer 60, but also mechanically joined to each other with the fastening member 37.

As described above, in the adhesive member 16 according to this embodiment, the first pin portion 30 and the second pin portion 40 each have the through hole 36 that penetrates in the axial direction. According to this configuration, the first adherend member 100 and the second adherend member 110 are mechanically joined to each other using the fastening member 37, thereby being capable of further increasing the joint strength of the first adherend member 100 and the second adherend member 110.

Seventh Embodiment

Figure 33:
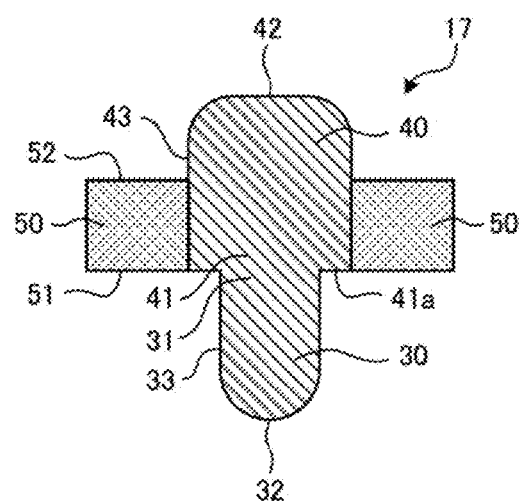
FIG. 33 is a sectional view for schematically illustrating a configuration of an adhesive member according to a seventh embodiment.

An adhesive member according to a seventh embodiment is described. FIG. 33 is a sectional view for schematically illustrating a configuration of an adhesive member 17 according to this embodiment. Description of configurations similar to those of any of the first to sixth embodiments is omitted. As illustrated in FIG. 33, the distal end portion 32 of the first pin portion 30 in the adhesive member 17 according to this embodiment has a hemispherical shape. According to this configuration, the distal end portion 32 of the first pin portion 30 has a tapered shape. Thus, for example, in the process illustrated in FIG. 3, the first pin portion 30 can be easily inserted into the first hole 101 of the first adherend member 100.

In this embodiment, the distal end portion 32 of the first pin portion 30 has the hemispherical shape, but the distal end portion 42 of the second pin portion 40 may have a hemispherical shape. In this case, for example, in the process illustrated in FIG. 4, the second pin portion 40 can be easily inserted into the second hole 111 of the second adherend member 110.

Figure 34:
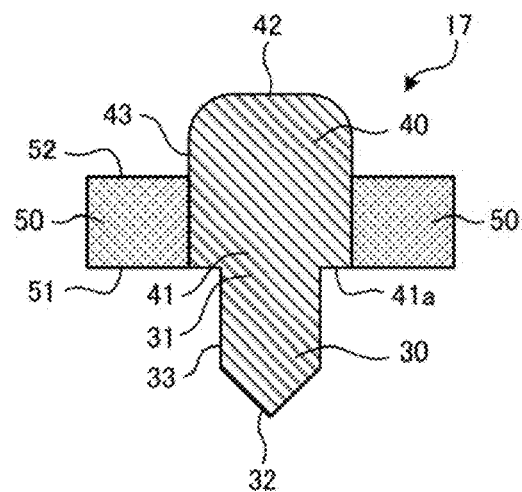
FIG. 34 is a sectional view for schematically illustrating a modification example of the configuration of the adhesive member according to the seventh embodiment.

FIG. 34 is a sectional view for schematically illustrating a modification example of the configuration of the adhesive member 17 according to this embodiment. As illustrated in FIG. 34, in this modification example, the distal end portion 32 of the first pin portion 30 has a conical shape. The distal end portion 32 has, for example, a circular conical shape. According to this configuration, similarly to the configuration illustrated in FIG. 33, the first pin portion 30 can be easily inserted into the first hole 101 of the first adherend member 100.

Eighth Embodiment

Figure 35:
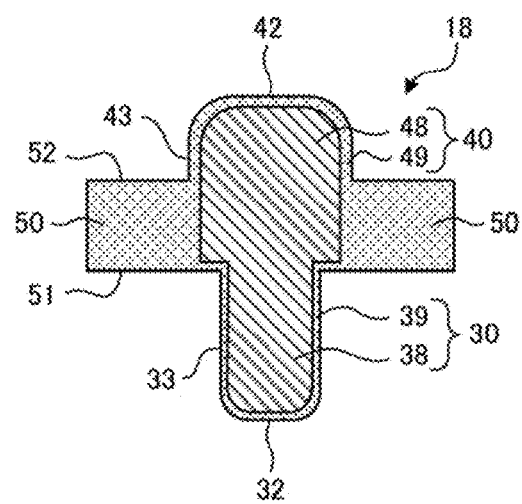
FIG. 35 is a sectional view for schematically illustrating a configuration of an adhesive member according to an eighth embodiment.

An adhesive member according to an eighth embodiment is described. FIG. 35 is a sectional view for schematically illustrating a configuration of an adhesive member 18 according to this embodiment. Description of configurations similar to those of any of the first to seventh embodiments is omitted. As illustrated in FIG. 35, at least a surface of the first pin portion 30 in the adhesive member 18 according to this embodiment is formed using an adhesive. The first pin portion 30 internally includes a reinforcing member 38 formed using metal or resin. That is, the first pin portion 30 includes the reinforcing member 38, and an adhesive layer 39 that covers an outer side of the reinforcing member 38.

Similarly, at least a surface of the second pin portion 40 is formed using an adhesive. The second pin portion 40 internally includes a reinforcing member 48 formed using metal or resin. That is, the second pin portion 40 includes the reinforcing member 48, and an adhesive layer 49 that covers an outer side of the reinforcing member 48. The reinforcing member 38 and the reinforcing member 48 are formed integrally with each other using the same material. The adhesive layer 39 and the adhesive layer 49 are formed using the same material as the flange portion 50. According to this configuration, the strength of the first pin portion 30 and the second pin portion 40 can be increased.

Ninth Embodiment

Figure 36:
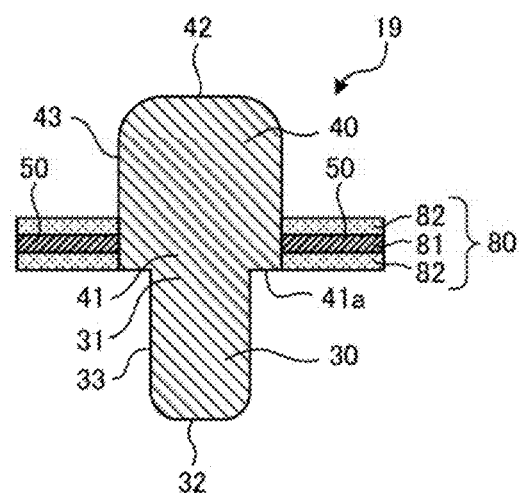
FIG. 36 is a sectional view for schematically illustrating a configuration of an adhesive member according to a ninth embodiment.

An adhesive member according to a ninth embodiment is described. FIG. 36 is a sectional view for schematically illustrating a configuration of an adhesive member 19 according to this embodiment. Description of configurations similar to those of any of the first to eighth embodiments is omitted. As illustrated in FIG. 36, the flange portion 50 in the adhesive member 19 according to this embodiment is formed of a double-sided tape 80. The double-sided tape 80 includes a tape-like tape layer 81, and adhesive layers 82 formed on both surfaces of the tape layer 81. Each adhesive layer 82 is formed using an adhesive of a type that requires application of pressure. It is preferred that the double-sided tape 80 be a product subjected to adhesion prevention processing so that a high adhesive strength is not exhibited under no pressure.

The embodiments and the modification example described above may be carried out in combinations.

REFERENCE SIGNS LIST 11, 12, 13, 14, 15, 16, 17, 18, 19 adhesive member, 30 first pin portion, 31 bottom portion, 32 distal end portion, side surface, 34 claw portion, 34a flexible portion, 34b protruding portion, 35 male thread portion, 36 through hole, 37 fastening member, 38 reinforcing member, 39 adhesive layer, 40 second pin portion, 41 bottom portion, 41a step surface, 42 distal end portion, 43 side surface, 48 reinforcing member, 49 adhesive layer, 50 flange portion, 51, 52 surface, 60 adhesive layer, 70 additional adhesive, 71 adhesive layer, 80 double-sided tape, 81 tape layer, 82 adhesive layer, 100 first adherend member, 100a, 100b surface, 101 first hole, 102 female thread portion, 110 second adherend member, 110a, 110b surface, 111 second hole, 200 electronic device casing, 201 railway vehicle, 202 aircraft, 203 automobile, 204 elevating machine, 205 household electrical appliance.

The invention claimed is:
1. An adhesive member, comprising:
a first pin portion to be inserted into a first hole formed in a first adherend member;
a second pin portion which is to be inserted into a second hole formed in a second adherend member to be adhered to the first adherend member, and is formed coaxially with the first pin portion; and a flange portion all of which is formed using an adhesive, and is mounted to a side surface of the first pin portion or a side surface of the second pin portion in a flange shape.

2. The adhesive member according to claim 1, wherein a diameter of the first pin portion is smaller than a diameter of the second pin portion.

3. The adhesive member according to claim 1, wherein each of the first pin portion and the second pin portion is formed using metal or resin.

4. The adhesive member according to claim 1, wherein each of the first pin portion and the second pin portion is formed using an adhesive.

5. The adhesive member according to claim 4, wherein each of the first pin portion and the second pin portion internally includes a reinforcing member formed using metal or resin.

6. The adhesive member according to claim 1, wherein the first pin portion is formed so as to have a fitting relationship with the first hole.

7. The adhesive member according to claim 1, wherein the first pin portion has a male thread portion.

8. The adhesive member according to claim 1, wherein a distal end portion of the first pin portion has a hemispherical shape or a conical shape.

9. The adhesive member according to claim 1, wherein the first pin portion includes a claw portion so as to be fixed to the first adherend member.

10. The adhesive member according to claim 1, wherein a length dimension of the first pin portion is smaller than a depth dimension of the first hole.

11. The adhesive member according to claim 1, wherein the first pin portion and the second pin portion each have a through hole that penetrates in an axial direction.

12. The adhesive member according to claim 1, wherein the first pin portion has a groove formed in the side surface or a hole formed through the first pin portion.

13. The adhesive member according to claim 1, wherein the flange portion is in a solid state at room temperature.

14. The adhesive member according to claim 13, wherein the flange portion is formed using a thermosetting adhesive or a hot-melt adhesive.

15. The adhesive member according to claim 13, wherein the flange portion is formed using a closed-cell adhesive that expands during curing.

16. The adhesive member according to claim 1, wherein the flange portion is formed of a double-sided tape.

17. An adhesion method, comprising providing the adhesive member of claim 1 and adhering the first adherend member and the second adherend member to each other using the adhesive member.

18. A method of manufacturing an electronic device casing, comprising manufacturing an electronic device casing using the adhesion method of claim 17.

* * * * *